(12) United States Patent
Nobori et al.

(10) Patent No.: US 6,528,599 B1
(45) Date of Patent: Mar. 4, 2003

(54) METHOD FOR PREPARING LIVING POLYMER IN THE PRESENCE OF PHOSPHAZENIUM SALT

(75) Inventors: Tadahito Nobori, Kanagawa (JP); Atsushi Shibahara, Chiba (JP); Shinji Kiyono, Chiba (JP); Takaomi Hayashi, Chiba (JP); Katsuhiko Funaki, Chiba (JP); Isao Hara, Kanagawa (JP); Kazumi Mizutani, Kanagawa (JP); Usaji Takaki, Kanagawa (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/549,037

(22) Filed: Apr. 13, 2000

(30) Foreign Application Priority Data

Apr. 13, 1999 (JP) ............................ 11-105433

(51) Int. Cl.$^7$ ............................ C08H 2/00; C08F 4/04
(52) U.S. Cl. ..................... 526/193; 526/81; 526/193; 526/217; 526/236; 526/258; 526/262; 526/264; 526/303.1; 526/316; 526/317.1; 526/318; 526/319; 526/329.2; 526/329.7; 526/341
(58) Field of Search ............................ 526/319, 303.1, 526/346, 317.1, 318, 193, 81, 217, 236, 258, 262, 264, 316, 329.2, 329.7, 341

(56) References Cited

U.S. PATENT DOCUMENTS 5,990,352 A * 11/1999 Nobori et al. ............... 564/12
6,077,930 A * 1/2000 Nobori et al. ............... 528/354

FOREIGN PATENT DOCUMENTS

| EP | 0691334 A | | 1/1996 |
|----|-----------|---|--------|
| EP | 0791600 | * | 8/1997 |
| EP | 0879838 A | | 11/1998 |
| EP | 1 044 989 A1 | | 10/2000 |

OTHER PUBLICATIONS

Pietzonka T., Seebach D.: The P4–Phosphazene Base as part of a new metal–free initiator system for the anionic polymerization of methyl methacrulate: Angewandte Chemie Int. Ed. Engl., vol. 32, No. 5, 1993, pp. 716–717.

* cited by examiner

Primary Examiner—Tatyana Zalukaeva
(74) Attorney, Agent, or Firm—Burns, Doane, Swecker & Mathis, LLP

(57) ABSTRACT

The present invention provides a method of preparing a polymer, which comprises subjecting a monomer containing at least a polar unsaturated compound to anionic polymerization in the presence of a phosphazenium compound represented by the formula (1):

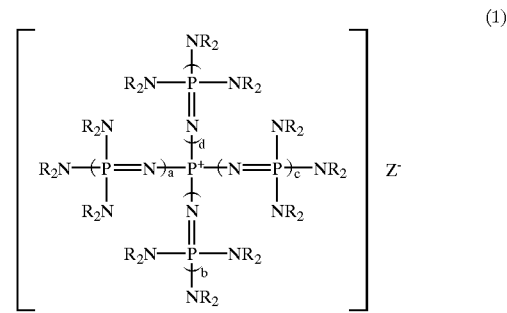

(wherein $Z^-$ is an anion of an active hydrogen compound in the form where a proton is eliminated from the active hydrogen compound and transferred to the anion; a, b, c and d each represents 1 or 0, but all of them are not simultaneously 0; and R may the same or different and each represents a hydrocarbon group having 1 to 10 carbon atoms, and two R(s) on the same nitrogen atom are optionally combined each other to form a cyclic structure), or in the presence of the phosphazenium compound and the active hydrogen compound. The resulting polymer is characterized by narrow molecular weight distribution.

24 Claims, 1 Drawing Sheet

METHOD FOR PREPARING LIVING POLYMER IN THE PRESENCE OF PHOSPHAZENIUM SALT

BACKGROUND OF THE INVENTION

1. Filed of the Invention

The present invention relates to a method for preparing a polymer by anionic polymerization of a polar unsaturated compound. The polymer or copolymer is a very important polymer for use as a raw material of a polymeric material or a functional polymer.

2. Description of the Related Art

A great number of studies have been made on anionic polymerization of a polar unsaturated compound for a long period of time and various technique have hitherto been developed (e.g. "Lectures: Theory of Polymerization Reaction, IV Anionic Polymerization", issued by Teiji TSURUTA, page 12, Kagaku Dojin (1973); and New Polymer Experimental Science, Vol. 2, "Synthesis and Reaction of New Polymer (1), Synthesis of Addition Polymer", pages 165 to 196, Kyoritsu Shuppan Co., Ltd. (1995)).

It has been well known that metal-containing catalysts, for example, metals such as alkali metal or alkali earth metal or a compound thereof, typical metallic complex, rare earth metal complex, etc. cause anionic polymerization (nucleophilic polymerization) of the polar unsaturated compound.

However, various physical properties and thermal stability of the polymer obtained by using the metal-containing catalyst are drastically influenced by remained metallic components, thereby requiring a special method or complicated step of sufficiently removing these metallic components in the preparation of the polymer.

It has also been publicly known that metal-free catalysts, for example, amine compounds, quaternary ammonium salts, quaternary phosphonium salts, etc. cause anionic polymerization. However, the amine compounds have a problem that the polymerization activity is poor and odor of the amine component is remained in the obrained polymer, whereas, the quaternary ammonium salts and quaternary phosphonium salts have a problem that they must be stored at a low temperature because of poor stability and the catalyst is decomposed during the polymerization reaction.

There has also been known an example wherein methyl methacrylate was polymerized in the presence of a phosphazene compound as a non-metallic catalyst (T. Pietzonka, D. Seebach, Angew. Chem. Int. Ed. Engl. 1993, 35, 716). Although the phospazene compound used in this method is an effective catalyst having strong basicity, a complicated step is required to synthesize the phosphazene compound and, moreover, a stronger basic compound such as potassium amide must be used to impart strong basicity (Nachr. Chem. Lab. 1990, 38, 1216). Therefore, the phosphazene compound is not advantageous from an industrial point of view. Also the compound has poor handling, that is, properties are liable to be changed by a carbon dioxide gas in an air because of its strong basicity.

It has been found that poly(methyl methacrylate) obtained by polymerizing methyl methacrylate using the phosphazene compound with reference to the above documents is a mixture of a two kinds of polymers whose number-average molecular weight are 64,400 and 8,800 as shown in Comparative Example 1. As shown in Comparative Example 2, poly(methacrylonitrile) obtained by polymerizing methacrylonitrile was also a mixture of two kinds of polymers. These results show that the polymerization reaction using the phosphazene compound as the catalyst is not accurately controlled.

An object of the present invention is to find a catalyst which is easily prepared and does not require any care about a storing process or decomposition during the polymerization in anionic polymerization of a polar unsaturated compound, and which does not contain any metallic component and has high activity, and which does not remain odor in the obtained polymer and is superior in ability of controlling the polymerization reaction, and to provide a method of efficiently preparing a polymer by using the catalyst.

SUMMARY OF THE INVENTION

To attain the above object, the present inventors have intensively studied. As a result, we have found a phosphazenium compound represented by the formula (1) is a remarkably effective catalyst which does not require any care about a storing process or decomposition during the polymerization and exhibits a high catalytic activity to anionic polymerization of a polar unsaturated compound, whereby the polymerization reaction proceeds while maintaining a living polymer regardless of the presence or absence of an active hydrogen compound, and not only an average molecular weight but also the number of moles of the resulting polymer can be controlled. Thus, the present invention has been completed.

That is, the present invention provides a method for preparing a polymer, which comprises subjecting a monomer containing at least a polar unsaturated compound to anionic polymerization in the presence of a phosphazenium compound represented by the formula (1):

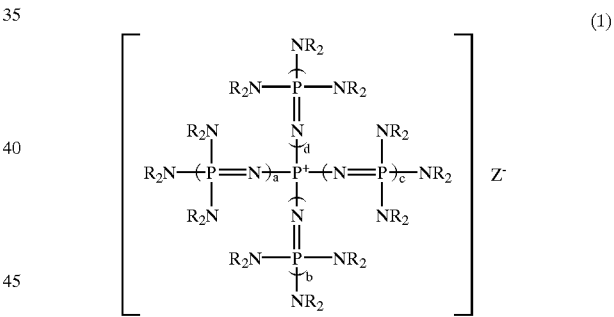

(wherein $Z^-$ is an anion of an active hydrogen compound in the form where a proton is eliminated from the active hydrogen compound and transferred to the anion; a, b, c and d each represents 1 or 0, but all of them are not simultaneously 0; and R may be the same or different and each represents a hydrocarbon group having 1 to 10 carbon atoms, and two R(s) on the same nitrogen atom are optionally combined each other to form a cyclic structure), or in the presence of the phosphazenium compound and the active hydrogen compound.

DESCRIPTION OF THE PREFERRED EMBODIMENTS

Figure 1:
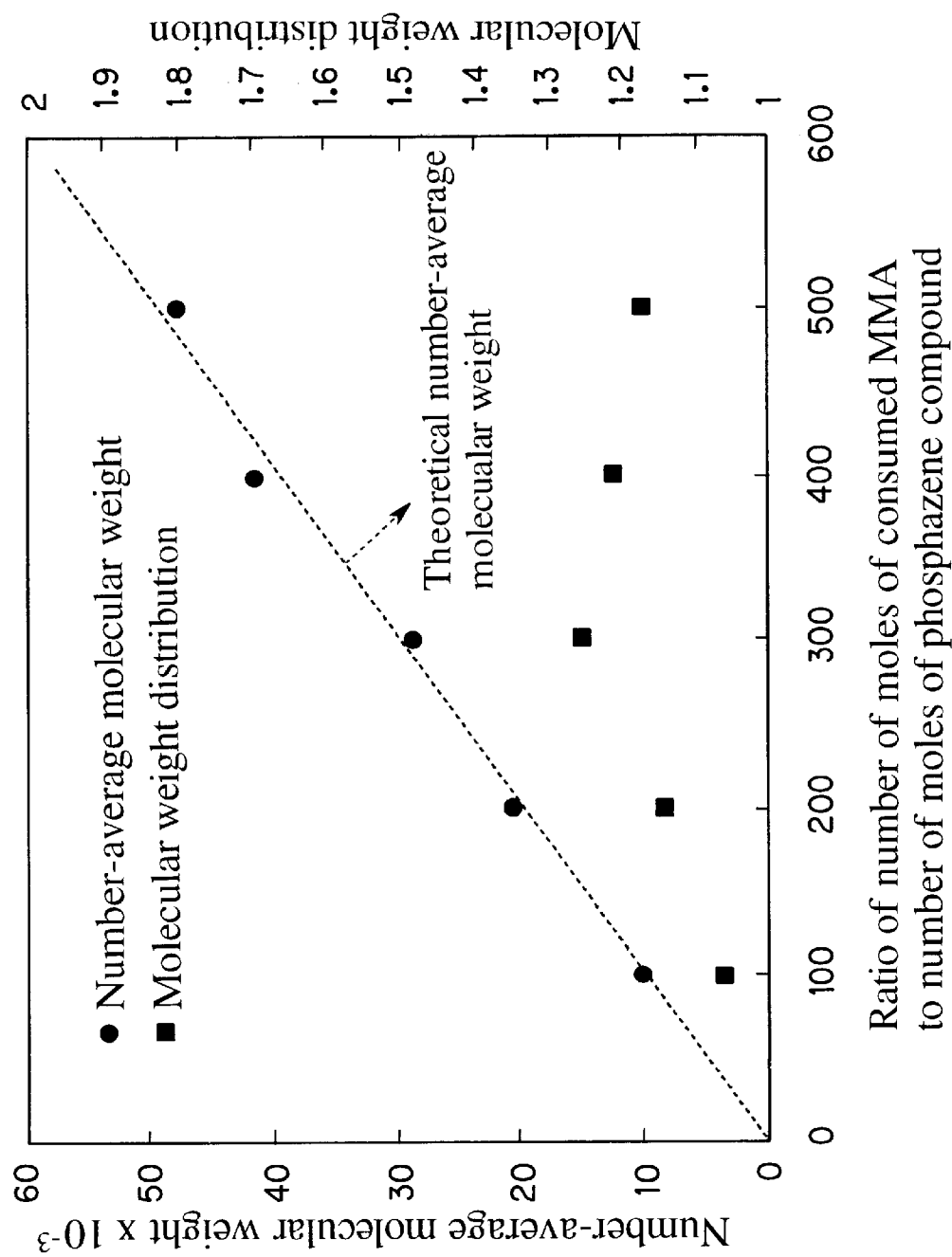
FIG. 1 is a graph illustrating that the polymerization of methyl methacrylate shown in Example 1 of the present invention is living polymerization.

In the method of the present invention, an unsaturated group means a carbon-carbon double bond and a polar unsaturated compound is a compound having a polar functional group selected from the group consisting of carbonyl group, cyano group and pyridyl group, and an unsaturated group in the same molecule, and the both form a conjugated system directly or indirectly.

The compound includes, for example, (1) (meth)acrylates, (2) (meth)acrylonitriles, (3) acrylamides, (4) vinyl pyridines, (5) N-substituted maleimides, (6) vinyl ketones, or (7) styrene derivatives. In addition, the compound may be any polar unsaturated compound capable of conducting anionic polymerization using the method of the present invention.

Typical examples thereof include the followings.

(1) (Meth)acrylates are esters of acrylic acid or methacrylic acid. Examples thereof include:

- (1)-(i) monoesters of monohydric alcohols and acrylic acid or methacrylic acid, for example, methyl acrylate, methyl methacrylate, ethyl acrylate, propyl methacrylate, butyl acrylate, 2-ethylhexyl methacrylate, lauryl acrylate, stearyl methacrylate, 1,1,1,3,3,3-hexafluoroisopropyl acrylate, 1,1,1,3,3,3-hexafluoroisopropyl methacrylate, 2,2,2-trifluoroethyl acrylate, 2,2,2-trifluoroethyl methacrylate, 1H,1H,2H,2H-heptadecafluorodecyl acrylate, allyl acrylate, allyl methacrylate, cyclohexyl methacrylate, isofonyl acrylate, glycidyl acrylate, glycidyl methacrylate, tetrahydrofurfuryl acrylate, benzyl acrylate, or β-phenylethyl methacrylate;
- (1)-(ii) monoesters of dihydric alcohol whose one terminal is protected with an ether bond, and acrylic acid or methacrylic acid, for example, 2-methoxyethyl acrylate, 2-ethoxyethyl methacrylate, 2-phenoxyethyl acrylate, 2-dicyclopentenyloxyethyl acrylate, 1-methoxy-2-propyl methacrylate, 3-methoxypropyl acrylate, 4-ethoxybutyl methacrylate, 6-methoxyhexamethyl acrylate, methoxydiethylene glycol acrylate, phenoxydipropylene glycol methacrylate, ethoxytripropylene glycol methacrylate, ethoxypolyethylene glycol acrylate, or methoxypolypropylene glycol methacrylate;
- (1)-(iii) polyhydric esters wherein all hydroxyl groups of dihydric or polyhydric alcohols, and acrylic acid or methacrylic acid are esterified, for example, ethylene glycol diacrylate, ethylene glycol dimethacrylate, propylene glycol diacrylate, propylene glycol dimethacrylate, 1,3-propanediol dimethacrylate, 1,4-butanediol diacrylate, 1,6-hexanediol dimethacrylate, neopentyl glycol diacrylate, neopentyl glycol dimethacrylate, diethylene glycol diacrylate, dipropylene glycol dimethacrylate, triethylene glycol dimethacrylate, tripropylene glycol diacrylate, polyethylene glycol diacrylate, polypropylene glycol diacrylate, polypropylene glycol dimethcrylate, glycerin triacrylate, glycerin trimethacrylate, pentaerythritol tetramethacrylate, dipentaerythritol hexaacrylate, trimethylolpropane triacrylate, poly(ethylene oxide) triol triacrylate, poly(proprene oxide)triol triacrylate, and poly(propylene oxide)triol trimetahcrylate;
- (1)-(iv) esters of alcohols having an ester bond, and acrylic acid or methacrylic acid, for example, 2-benzoyloxyethyl acrylate, 2-benzoyloxyethyl methacrylate, 2-acetyloxy acrylate, 5-tetrahydrofurfuryloxycarbonylpentyl acrylate, 5-tetrahydrofurfuryloxycarbonylpenthyl methacrylate, and 2,2,6,6-tetramethyl-4-oxy-5-oxa-heptan-1,7-diyl-diacrylate;
- (1)-(v) esters of alcohols having a cyclic acetal bond, and acrylic acid or methacrylic acid, for example, 2-tert-butyl-1,3-dioxycyclopentan-2'-yl methacrylate, and 2-tert-butyl-5-ethyl-5-vinylcarbonyloxymethyl-1,3-dioxycyclohexan-2' (2)-yl acrylate;
- (1)-(vi) esters of oxysuccinimide and acrylic acid or methacrylic acid, for example, N-oxysuccinimide acrylate and N-oxysuccinimide methacrylate;
- (1)-(vii) esters of alcohols having a secondary amino group, and acrylic acid or methacrylic acid, for example, 2-dimethylaminoethyl acrylate and 2-ethylpropylaminoethyl methacrylate; and
- (1)-(viii) esters of alcohols having a cyano group, and acrylic acid and methacrylic acid, for example, 2-cyanoethyl acrylate or 2-cyanopropyl methacrylate.

(2) The (meth)acrylonitriles are acrylonitrile or methacrylonitrile.

(3) The acrylamides are acrylamide, N-monosubstituted or N,N-disubstituted acrylamides. Examples of the acrylamides are acrylamide:

- (3)-(i) N-monosubstituted acrylamides, for example, N-methylacrylamide, N-ethylacrylamide, N-propylacrylamide, N-butylacrylamide, N-octylacrylamide, N-phenylacrylamide, N-glycidylacrylamide, and N,N'-ethylenebisacrylamide;
- (3)-(ii) N,N-disubstituted acrylamides, for example, N,N-dimethylacrylamide, N-ethyl-N-methylacrylamide, N,N-diethylacrylamide, N,N-di-normal-propylacrylamide, N,N-dioctylacrylamide, N,N-diphenylacrylamide, N-ethyl-N-glycidylacrylamide, N,N-diglycidylacrylamide, N-methyl-N-(4-glycidyloxybutyl)acrylamide, N-methyl-N-(5-glycidyloxypentyl)acrylamide, N-methyl-N-(6-glycidyloxyhexyl)acrylamide, N-acryloylpyrrolidine, N-acryloyl-L-prolinemethyl ester, N-acryloylpiperidine, N-acryloylmorpholine, and 1-acryloylimidazole; and
- (3)-(iii) N,N'-disubstituted bisacrylamides, for example, N,N'-diethyl-N,N'-ethylenebisacrylamide, N,N'-dimethyl-N,N'-hexamethylenebisacrylamide, and di(N,N'-ethylene)-bisacrylamide.

(4) The vinylpyridines include, for example, vinyl- or isopropenyl-substituted pyridines, such as 2-vinylpyridine, 2-isopropenylpyridine, and 4-vinylpyridine.

(5) The N-susbtitiuted maleimides include:

- (5)-(i) N-aliphatic-substituted maleimides, for example, N-methylmaleimide and N-ethylmaleimide; and
- (5)-(ii) N-aromatic-substituted maleimides, for example, N-phenylmaleimide and N-(4-methylphenyl) maleimide.

(6) The vinyl ketones include, for example, methyl vinyl ketone, isopropenyl methyl ketone, ethyl vinyl ketone, ethyl isopropenyl keton, butyl vinyl ketone, and phenyl vinyl ketone.

(7) The styrene derivatives include, for example, p-methoxycarbonylstyrene, p-tertiary-butoxycarbonylstyrene, and p-cyanostyrene.

These polar unsaturated compounds may have any substituted other than those described above as far as it does not inhibit the method of the present invention.

Among these polar unsaturated compounds, a polar unsaturated compound having two or more unsaturated groups in one molecule afford a highly crosslinked polymer by the polymerization thereof, but is more suited to crosslink principal chains of a polymer of a polar unsaturated compound having one unsaturated group by copolymerization with the polar unsaturated compound having one unsaturated group.

Among these polar unsaturated compounds, preferred one includes:

(1)-(i) monoesters of monohydric alcohols and acrylic acid or methacrylic acid, for example, methyl acrylate, methyl methacrylate, ethyl acrylate, propyl methacrylate, butyl acrylate, 2-ethylhexyl methacrylate, lauryl acrylate, stearyl methacrylate, 1,1,1,3,3,3-hexafluoroisopropyl acrylate, 1,1,1,3,3,3-hexafluoroisopropyl methacerylate, 2,2,2-trifluoroethyl acrylate, 2,2,2-trifluoroethyl methacrylate, 1H,1H,2H,2H-heptadecafluorodecyl acrylate, allyl acrylate, allyl methacrylate, cyclohexyl methacrylate, isofonyl acrylate, glycidyl acrylate, glycidyl methacrylate, tetrahydrofurfuryl acrylate, benzyl acrylate, and β-phenylethyl methacrylate;

(1)-(ii) monoesters of dihydric alcohol whose one terminal is protected with an ether bond, and acrylic acid or methacrylic acid, for example, 2-methoxyethyl acrylate, 2-ethoxyethyl methacrylate, 2-phenoxyethyl acrylate, 2-dicyclopentenyloxyethyl acrylate, 1-methoxy-2-propyl methacrylate, 3-methoxypropyl acrylate, 4-ethoxybutyl methacrylate, 6-methoxyhexyl acrylate, methoxydiethylene glycol acrylate, phenoxydipropylene glycol methacrylate, ethoxytripropylene glycol methacrylate, ethoxypolyethylene glycol acrylate, and methoxypolypropylene glycol methacrylate;

(1)-(iii) polyhydric esters wherein all hydroxyl groups of dihydric or polyhydric alcohols, and acrylic acid or methacrylic acid are esterified, for example, ethylene glycol diacrylate, ethylene glycol dimethacrylate, propylene glycol diacrylate, propylene glycol dimethacrylate, 1,3-propanediol dimethacrylate, 1,4-butanediol diacrylate, 1,6-hexanediol dimethacrylate, neopentyl glycol diacrylate, neopentyl glycol dimethacrylate, diethylene glycol diacrylate, dipropylene glycol dimethacrylate, triethylene glycol dimethacrylate, tripropylene glycol diacrylate, polyethylene glycol diacrylate, polypropylene glycol diacrylate, polypropylene glycol dimethcrylate, and glycerin triacrylate, glycerin trimethacrylate, pentaerythritol tetramethacrylate, dipentaerythritol hexaacrylate, trimethylolpropane triacrylate, poly(ethylene oxide)triol triacrylate, poly(propylene oxide) triol triacrylate, and poly(propylene oxide)triol trimetahcrylate;

(2) acrylonitrile or methacrylonitrile;

(3)-(ii) N,N-disubstituted acrylamides, for example, N,N-dimethylacrylamide, N-ethyl-N-methylacrylamide, N,N-diethylacrylamide, N,N-di-normal-propylacrylamide, N,N-dioctylacrylamide, N,N-diphenylacrylamide, N-ethyl-N-glycidylacrylamide, N,N-diglycidylacrylamide, N-methyl-N-(4-glycidyloxybutyl)acrylamide, N-methyl-N-(5-glycidyloxypentyl)acrylamide, N-methyl-N-(6-glycidyloxyhexyl)acrylamide, N-acryloylpyrrolidine, N-acryloyl-L-prolinemethyl ester, N-acryloylpiperidine, N-acryloylmorpholine, and 1-acryloylimidazole;

(4) vinyl- or isopropenyl-substituted pyridines, such as 2-vinylpyridine, 2-isopropenylpyridine, and 4-vinylpyridine;

(5)-(ii) N-aromatic-substituted maleimides, for example, N-phenylmaleimide and N-(4-methylphenyl)maleimide; and (6) vinyl ketones, for example, methyl vinyl ketone, isopropenyl methyl ketone, ethyl vinyl ketone, ethyl isopropenyl keton, butyl vinyl-ketone, and phenyl vinyl ketone.

(1)-(i) monoesters of monohydric alcohols and acrylic acid or methacrylic acid; (1)-(ii) monoesters of dihydric alcohols whose one terminal is protected with an ether bond, and acrylic acid or methacrylic acid; (1)-(iii) polyhydric esters wherein all hydroxyl groups of dihydric or polyhydric alcohols, and acrylic acid or methacrylic acid are esterified; (2) acrylonitrile or methacrylonitrile; and (3)-(ii) N,N-disubstituted acrylamides are more preferred.

In the method of the present invention, these polar unsaturated compounds may be-used alone or in combination, and may also be used in combination with alkylene oxides. In such way, a copolymer of plural monomers can be prepared.

The alkylene oxide compound used in combination includes, for example, epoxy compounds such as ethylene oxide, propylene oxide, 1,2-butylene oxide, 2,3-butylene oxide, styrene oxide, cyclohexene oxide, epichlorohydrin, epibromohydrin, methyl glycidyl ether, allyl glycidyl ether, and phenyl glycidyl ether. Among these compounds, ethylene oxide, propylene oxide, 1,2-butylene oxide and styrene oxide are preferred, and propylene oxide or ethylene oxide are more preferred. Propylene oxide is particularly preferred.

When using these compounds in combination, there can be employed a method of simultaneously using plural polar unsaturated compounds or using single or plural polar unsaturated compounds in combination with single or plural alkylene oxide compounds, a method of using them in turn, or a method of repeating the use in combination. When plural monomer are simultaneously used in combination and polymerized, a comparatively high random copolymer can be obtained, although it depends on a difference in reactivity of these compounds. When two or more monomers are polymerized in order, a block copolymer containing two or more kinds of blocks can be obtained. When such use in combination is repeated in order, a more complicated polymer can be obtained.

It is particularly preferred to prepare a block copolymer of plural monomers by using the polar unsaturated compound and alkylene oxide compound in order. In that case, the alkylene oxide is preferably propylene oxide or ethylene oxide, more preferably propylene oxide.

The polar unsaturated compound further includes, for example, compound having active hydrogen, such as acrylamide or compound that can be converted into an active hydrogen compound by further incorporating active hydrogen due to polymerization, such as acrylate. A complicated polymer or copolymer can be prepared by polymerizing such a polar unsaturated compound in the presence of a phospazenium compound represented by the formula (I).

In the method of the present invention, at least a polar unsaturated compound is subjected to anionic polymerization in the presence of a phospazenium compound represented by the formula (I), or in the presence of the phospazenim compound and an active hydrogen compound.

A cation in the phospazenium compound represented by the formula (I) in the method of the present invention is represented by a canonial structural formula wherein positive charge is localized on a phosphorous atom at the center. Numerous canonial structural formulas other than the above one are drawn and practically the charge is delocalized over the whole molecule.

R(s) in the phosphazenium compound represented by the formula (1) are the same or different and each represents a hydrocarbon group having 1 to 10 carbon atoms, and R(s) are selected from aliphatic or aromatic hydrocarbon groups, for example, methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tert-pentyl, 3-methyl- 2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, 1,1-dimethyl-3,3-dimethylbutyl (popular name: tert-octyl), nonyl, decyl, phenyl, 4-toluyl, benzyl, 1-phenylethyl, and 2-phenylethyl. Among these hydrocarbon groups, an aliphatic hydrocarbon group having 1 to 8 carbon atoms, such as methyl, ethyl, n-propyl, isopropyl, tert-butyl, tert-pentyl and 1,1-dimethyl-3,3-dimethylbutyl is preferred and a methyl group are more preferred.

The cyclic amino group in case where two R(s) on the same nitrogen atom in the phosphazenium compound represented by the formula (1) are combined each other, together with the nitrogen atom, to form a cyclic structure is a cyclic secondary amino group containing 4 to 6 carbon atoms on the ring, and —NR$_2$ is converted into a 5- to 7-membered cyclic secondary amino group containing a nitrogen atom. The cyclic secondary amino group includes, for example, pyrrolidin-1-yl group, piperidin-1-yl group, and morpholin-4-yl, and those substituted with an alkyl group such as methyl or ethyl. A non-substituted pyrrolidin-1-yl group, piperidin-1-yl group, and morpholin-4-yl group are preferred. All nitrogen atoms in the phosphazenium compound represented by the chemical formula (1) may have such a cyclic structure, or may be part thereof. a, b, c and d in the phosphazenium compound represented by the formula (1) are respectively 1 or 0, with a-proviso that all of them are not simultaneously 0. Preferably, a, b, c and d represent a numeral in a combination of (1, 1, 1, 1) or (0, 1, 1, 1) regardless of the sequence. More preferably, b, c and d represent a numeral in a combination of (1, 1, 1, 1).

The active hydrogen compound that affords Z$^-$ in the phosphozenium compound represented by the formula (1), or the active hydrogen compound that is contained in case where the anionic polymerization is conducted in the presence of the phosphazenium compound and active hydrogen compound includes, for example, hydrogen fluoride, active hydrogen compound having active hydrogen on a carbon atom, active hydrogen compound having active hydrogen on an oxygen atom, active hydrogen compound having active hydrogen on a nitrogen atom, or active hydrogen compound having active hydrogen on a sulfur atom. Any active hydrogen compound can be used as far as it does not inhibit the method of the present invention.

Typical examples of the active hydrogen compound having active hydrogen on the carbon atom include hydrogen cyanide; monohydric carboxylates, for example, ethyl acetate, cyclohexyl propionate, isopropyl butyrate, methyl isobutyrate, tertiary butyl isobutyrate, hexyl caproate, butyl laurate, methyl stearate, ethyl oleate, methyl phenylacetate, methyl cyclohexanecarboxylate, 1,2-bis(2-propylcarbonyloxy)ethane, and 1,2,3-tris(2-propylcarbonyloxy)propane; polyhydric carboxylates, for example, dimethyl malonate, dimethyl methylmalonate, diethyl succininate, butyl 2,3-dimethylsuccinate, methyl adipate, ethyl suberate, methyl butanetetracarboxylate, 1,2-bis(2-methoxycarbonylethoxy)ethane, 1,2-bis(2-ethoxycarbonylpropoxy)ethane, 1,2-bis(2-ethoxycarbonylpropylmercapto)ethane, or N,N,N',N'-tetrakis(2-butoxycarbonylpropyl)ethylenediamine; ketocarboxylates, for example, ethyl acetacetate, cyclopentyl acetacetate, methyl carbamoylacetate, ethyl 2-cyclohexylcarbonylacetate, and butyl benzoylacetate; nitriles, for example, acetonitrile, 2-cyanopropane, malononitrile, methylmalononitrile, 1,3-dicyanopropane, or adiponitrile; and ketones, for example, acetone, methyl ethyl ketone, diisopropyl ketone, dicyclohexyl ketone, acetophenone, and isopropyl phenyl ketone.

Typical examples of the active hydrogen compound having active hydrogen on the oxygen atom include water, monohydric alcohols, for example, methanol, ethanol, normal-propanol, isopropanol, normal-butyl alcohol, sec-butyl alcohol, tert-butyl alcohol, isopentyl alcohol, tert-pentyl alcohol, normal-octyl alcohol, lauryl alcohol, cetyl alcohol, cyclopentanol, cyclohexanol, allyl alcohol, crotyl alcohol, methylvinylcarbinol, benzyl alcohol, 1-phenylethyl alcohol, triphenylcarbinol, cinnamyl alcohol; perfluoro-tert-butyl alcohol, α-hydroxyisopropyl phenyl ketone, α-hydroxycyclohexyl phenyl ketone and methyl α-hydroxisobutyrate polyhydric alcohols, for example, ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerin, diglycerin, pentaerythritol, and dipentaerythritol; and aromatic hydroxy compounds, for example, phenol, cresol, xylenol, 2-naphthol, 2,6-dihydroxynaphthalene, and bisphenol A.

Typical examples of the active hydrogen compound having active hydrogen on the nitrogen atom include aliphatic or aromatic primary amines, for example, methylamine, ethylamine, normal-propylamine, isopropylamine, normal-butylamine, isobutylamine, sec-butylamine, tert-butylamine, cyclohexylamine, benzylamine, β-phenylethylamine, aniline, o-toluidine, m-toluidine, and p-toluidine; aliphatic or aromatic secondary amines, for example, dimethylamine, methylethylamine, diethylamine, di-normal-propylamine, ethyl-normal-butylamine, methyl-sec-butylamine, dipentylamine, dicyclohexylamine, N-methylaniline, and diphenylamine; polyamine having a primary or secondary amino group, for example, ethylenediamine, di(2-aminoethyl)amine, hexamethylenediamine, 4,4'-diaminodiphenylmethane, tri(2-aminoethyl)amine, N,N'-dimethylethylenediamine, N,N'-diethylethylenediamine, or di(2-methylaminoethyl)amine; saturated cyclic secondary amines, for example, pyrrolidine, piperidine, morpholine, and 1,2,3,4-tetrahydroquinoline; unsaturated cyclic secondary amines, for example, 3-pyrroline, pyrrole, indole, carbazole, imidazole, pyrazole, and purine; cyclic polyamine having a secondary amino group, for example, piperazine, pyrazine, and 1,4,7-triazacyclononane; non-substituted or N-monosubstituted acid amides, for example, acetamide, propionamide, N-methylpropionamide, amide N-methylbenzoate, and amide N-ethylsearate; cyclic amides, for example, β-propiolactam, 2-pyrrolidone, δ-valerolctan, or ε-caprolactam; or imides, for example, imide succinate, imide maleate, and phthalimide.

Typical examples of the active hydrogen compound having active hydrogen on the sulfur atom include monohydric thiols, for example, methanethiol, ethanethiol, normal-butanethiol, tertiary-butanethiol, hexanethiol, decanethiol, cyclopentylmercaptan, and cyclohexylmercaptan polyhydric thiols, for example, 1,2-ethanedithiol, 1,3-propanedithiol, 2,3-butanedithiol, 1,6-hexanedithiol, 1,2,3-propanetrithiol, and 2,3-di(mercaptomethyl)-1,4-butanedithiol; or aromatic mercapto compounds, for example, thiophenol, o-thiocresol, thionaphthol, and 1,2-benzenedithiol.

The active hydrogen compound further includes poly(alkylene oxides) having active hydrogen at a terminal, for example, polyethylene oxide and polypropylene oxide; and polymers having active hydrogen at a terminal and/or in a principal chain, such as poly{(meth)acrylates}, poly{(meth)acrylonitriles}, poly(acrylamides), poly(vinyl pyridines, poly(N-substituted maleimides), poly(vinyl ketones), poly (styrene derivatives), polyesters, polyamides, polylactides and polysiloxanes, and copolymers thereof.

The above active hydrogen compound includes compounds having plural active hydrogens. All active hydrogens are eliminated to derive an anion, which forms an ion pair with plural phosphazenium cations, sometimes. Alternatively, an anion is derived from only part of them and forms an ion pair, while active hydrogen is not eliminated at the other portion. However, since the equilibrium reaction between a new anion formed by addition of the anion to the polar unsaturated compound and the portion having active hydrogen occurs reversibly and very rapidly, a proton is also eliminated from the portion where active hydrogen is remained without deriving an anion and the portion having active hydrogen of the active hydrogen compound in case of the coexistence of them, thus these portions is derived an anion. As a result, the polymerization is also initiated at these portions. It depends on the dissociation degree of active hydrogen, the reactivity of the resulting anion, kind of the polar unsaturated compound, or the kind of the solvent to be used whether the polymerization is initiated or not at all or part of the portion having active hydrogen.

The active hydrogen compound that affords $Z^-$ in the phosphazenium compound represented by the formula (1) and the active hydrogen compound which is contained when the anionic polymerization is conducted in the presence of the phosphazenium compound and active hydrogen compound may be the same or different. The active hydrogen compounds may be used alone, or plural active hydrogen compounds may also be used simultaneously.

Among these active hydrogen compounds, preferable one include hydrogen cyanide; monohydric carboxylates, for example, ethyl acetate, cyclohexyl propionate, isopropyl butyrate, methyl isobutyrate, tertiary butyl isobutyrate, hexyl caproate, butyl layrate, methyl stearate, ethyl oleate, methyl phenylacetate, methyl cyclohexanecarboxylate, 1,2-bis(2-propylcarbonyloxy)ethane, and 1,2,3-tris(2-propylcarbonyloxy)propane; polyhydric carboxylates, for example, dimethyl malonate, dimethyl methylmalonate, diethyl succininate, butyl 2,3-dimethylsuccinate, methyl adipate, ethyl suberate, methyl butanetetracarboxylate, 1,2-bis(2-methoxycarbonylethoxy)ethane, 1,2-bis(2-ethoxycarbonylpropoxy)ethane, 1,2-bis(2-ethoxycarbonylpropylmercapto)ethane, and N,N,N',N'-tetrakis(2-butoxycarbonylpropyl)ethylenediamine; water monohydric alcohols, for example, methanol, ethanol, normal-propanol, isopropanol, normal-butyl alcohol, sec-butyl alcohol, tert-butyl alcohol, isopentyl alcohol, tert-pentyl alcohol, normal-octyl alcohol, lauryl alcohol, cetyl alcohol, cyclopentanol, cyclohexanol, allyl alcohol, crotyl alcohol, methylvinylcarbinol, benzyl alcohol, 1-phenylethyl alcohol, triphenylcarbinol, cinnamyl alcohol; perfluoro-tert-butyl alcohol, α-hydroxyisopropyl phenyl ketone, α-hydroxycyclohexyl phenyl ketone and methyl α-hydroxyisbutyrate polyhydric alcohols, for example, ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerin, diglycerin, pentaerythritol, or dipentaerythritol; monohydric thiols, for example, methanethiol, ethanethiol, normal-butanethiol, tertiary-butanethiol, hexanethiol, decanethiol, cyclopentylmercaptan, and cyclohexylmercaptan; and poly(alkylene oxides), poly{(meth)acrylates}, poly{(meth)acrylonitriles}, poly(acrylamides), poly(vinyl pyridines), poly(N-substituted maleimides), poly(vinyl ketones), and poly(styrene derivatives), each having active hydrogen at a terminal and/or in a principal chain, and copolymers thereof.

These phosphazenium compounds may be used alone or in combination. These phosphazenium compounds can be synthesized by the method described in pages 12 to 13 of EP0791600, or a similar method.

The form of the polymerization reaction in the method of the present invention is not specifically limited. Any method capable of effectively bringing the phosphazenium compound represented by the formula (1) into contact with the polar unsaturated compound can be used. If necessary, a batch-wise method of charging them in one portion or a method of supplying the polar unsaturated compound intermittently or continuously can be carried out. When a copolymer is prepared, there can be employed a method of simultaneously supplying plural polar unsaturated compounds in one portion, a method of supplying them intermittently or continuously, or a method of using plural polar unsaturated compounds in order can be employed depending on the copolymer in the desired form. The amount of phosphazenium compound is not specifically limited, but is usually within a range from $1\times10^{-6}$ to $1\times10^{-1}$ moles, and preferably from $1\times10^{-4}$ to $3\times10^{-1}$ moles, per mole of the polar unsaturated compound. The temperature of the polymerization reaction varies depending on the kind or amount of the phosphazenium compound and polar unsaturated compound to be used, but is usually from −50 to 250° C., and preferably from −20 to 150° C. The pressure of the polymerization reaction varies depending on the kind or amount of the polar unsaturated compound and the reaction temperature, but is usually 3.0 MPa or less (absolute pressure represented by mega-pascal, the same rule applied correspondingly to the following), preferably from 0.01 to 1.5 MPa, and more preferably from 0.1 to 1.0 MPa.

The reaction time of the polymerization reaction varies depending on the kind or amount of the phosphazenium compound and polar unsaturated compound to be used and the reaction temperature, but is usually 50 hours or less, and preferably within a range from 0.1 to 24 hours.

To improve the storage stability, a trace amount of a polymerization inhibitor is added to the polar unsaturated compound. The polymerization reaction in the method of the present invention can also be carried out in the presence of the inhibitor sometimes.

A growth terminal of the polymer thus obtained has a carbon anion with high reactivity. Therefore, the terminal can also be modified chemically by reacting the anion with various organic compounds. In case where the polar unsaturated compound is subsequently reacted after subjecting to the anionic polymerization, the organic compound is not specifically limited, but aldehydes are preferably used. A polymer having a hydroxyl group at least one terminal can be prepared by reacting with aldehydes.

The aldehydes used in the reaction include, for example, acetaldehyde, propionaldehyde, butyraldehyde, isobutyraldehyde, valeraldehyde, capronaldehyde, heptaldehyde, caprylaldehyde, cylohexanecarboaldehyde, benzaldehyde, and 4-chlorobenzaldehyde. Among these aldehydes, aliphatic aldehydes such as acetaldehyde, propionaldehyde, butylaldehyde, isobutylaldehyde, valeraldehyde, capronaldehyde, heptaldehyde, or caprylaldehyde are preferred. For example, aliphatic aldehydes having 2 to 6 carbon atoms, such as acetaldehyde, propionaldehyde, butyraldehyde, isobutyraldehyde, valeraldehyde, and capronaldehyde are more preferred.

The polymerization reaction in the method of the present invention can be carried out in the molten state of the polar unsaturated compound, and a proper solvent can also be used, if necessary. The solution may be uniform or suspended. The solvent includes, for example, aliphatic or alicyclic hydrocarbons such as n-hexane, n-heptane, and cyclohexane; aromatic hydrocarbons such as benzene, toluene, and xylene; aromatic halides such as chlorobenzene and dichlorobenzene; ethers such as diethyl ether, diphenyl ether, tetrahydrofuran, tetrahydropyran, 1,4-dioxane, ethylene glycol dimethyl ether, and diethylene glycol diether ether; and aprotic polar solvents such as dimethylformamide, dimethyl sulfoxide, sulfolane, and N,N'-dimethylimidazolidinone. Any solvent can be used as far as it does not inhibit the method of the present invention.

After the completion of the polymerization, a phospazenium cation is remained as a pair ion at the terminal of the resulting polymer. To take out the polymer in a stable manner, the reaction can also be terminated by adding an inorganic acid such as hydrochloric acid, sulfuric acid or phosphoric acid, or an organic acid such as acetic acid, propionic acid, benzenesulfonic acid and p-toluenesulfonic acid to form a salt of the inorganic or organic acid.

The resulting polymer may be used as it is for the following purpose, or used for the following purpose after terminating the reaction, distilling off the solvent used optionally and drying. Usually, the polymer can be taken out the reaction solution itself or solution prepared by dissolving the dried solid into a proper solvent by pouring into a poor solvent as a precipitate. It is also possible to purify by repeating the precipitation process.

EXAMPLES

The following Examples further illustrate the present invention in more detail. These Examples are therefore to be considered in all respects as merely illustrative and not restrictive.

Example 1

Synthesis of Polymerization Initiator (Phosphazenium Compound) and Preparation of its Solution After a 200 ml flask was sufficiently dried, 2.00 g (11.5 mmol) of methyltrimethylsilyldimethylketene acetal (manufactured by Aldrich Co.) purified by distillation,: $Me_2C=C(OMe)OSiMe_3$ {also referred to as [(1-methoxy-2-methyl-1-propenyl)oxy]trimethylsilane} and 40 ml of dried tetrahydrofuran (hereinafter abbreviated to THF) were charged in the flask under a nitrogen atmosphere, followed by stirring to obtain a uniform solution. The uniform solution was ice-cooled and 10.9 ml (11.0 mmol) of a benzene solution of 1.01 M (M represents a molar concentration, the same rule applies correspondingly to the following) tetrakis[tris(dimethylamino)phosphoralinideneamino]phosphonium fluoride: $[(Me_2N)_3P=N]_4P^+,F^-$ (Me represents a methyl group, the same rule applies correspondingly to the following), which is commercially available from Fluka Co., was added dropwise over ten minutes. After the completion of the dropwise addition, an ice bath was removed and the internal temperature was returned to room temperature over about 20 minutes, followed by stirring at room temperature for one hour. To remove trimethylsilyl fluoride (having a boiling point of 16° C. under normal pressure) prepared during the reaction and methyltrimethysilyldimethylketene acetal (having a boiling point of 35° C. under 15 mmHg) remained as a result of excess addition from the reaction mixture, the reaction mixture was distilled under reduced pressure of 500 to 5 mmHg, together with THF and benzene, to obtain 9.07 g of tetrakis[tris(dimethylamino) phosphoralinideneamino]phosphonium(1-methoxy-2-methyl-1-propenyl)oxide: $[(Me_2N)_3P=N]_4P^+,Me_2C=C(OMe)O^-$ wherein R in the phosphazenium compound represented by the formula (1) is a methyl group, a, b, c and d each represents 1, and $Z^-$ is an anion derived by elimination of a proton from methyl isobutyrate. The yield was 98%.

Then, dried THF was added to 8.41 g (10.0 mmol) of tetrakis[tris(dimethylamino)phosphoralinideneamino] phosphonium(1-methoxy-2-methyl-1-propenyl)oxide thus obtained so that the volume becomes 20.0 ml accurately to prepare a THF solution of the 0.50 M phosphazenium compound.

Storage Stability Test of Phosphazenium Compound 2 ml of the THF solution of the 0.50 M phosphazenium compound was stored at room temperature under a nitrogen atmosphere. After one month, three months and six months, 0.1 ml of each sample was collected from the stored solution and dissolved in deuterated toluene, and then the measurement of $^{31}P$-NMR was conducted. As a result, any new spectrum was not observed in any case, except for a quinted corresponding to a phosphorous atom at the center of a phosphazenium cation constituting the phosphazenium compound and a doublet corresponding to four phosphorous atoms around it. The results show that the phosphazenium is hardly decomposed even after storage at room temperature for six months and is stable.

Preparation Example of poly(methyl methacrylate)

After a 200 ml flask was sufficiently dried, 1.00 ml (0.50 mmol) of a THF solution of the 0.50 M phosphazenium compound and 25 ml of dried THF were charged in the flask, followed by stirring to obtain a uniform solution. The uniform solution was cooled to 0° C. and 25 ml (5.01 g: containing 50.0 mmol of MMA) of a THF solution of 2.00 M methyl methacrylate (hereinafter abbreviated to MMA) was added dropwise at a rate at which the reaction temperature does not exceed 25° C. About 15 minutes was required for the dropwise addition. After the completion of the dropwise addition, the mixture was further stirred at 25° C. for one hour to obtain a polymerization reaction solution. Immediately, 1.00 ml (1.00 mmol) of a THF solution of 1.0 M acetic acid was added to terminate the reaction. A trace amount of the reaction mixture was collected and subjected to quantitative analysis according to gas chromatography using 1,3,5-trichlorobenzene as an internal standard. As a result, methyl methacrylate was completely consumed. The reaction mixture was concentrated to dryness under reduced pressure to obtain 5.43 g of a white solid. A solution prepared by dissolving the white solid in 10 ml of THF was poured into 300 ml of methanol. The deposited solid was collected by filtration and the solid was washed twice with 10 ml of methanol. The resulting solid was dried at room temperature under 10 mmHg for six hours to obtain 4.68 g of an odorless solid. $^1H$-NMR and $^{13}C$-NMR spectra were almost the same as those of poly(methyl methacrylate) manufactured by Aldrich Co.

A THF solution of 0.5% by weight of the resulting poly(methyl methacrylate) was prepared and subjected to GPC analysis wherein poly(methyl methacrylate) is used as a standard polymer, using a GPC column (two columns, shodex-KF-803L and shodex-KF-804L are connected each other, manufactured by Showa Electrical Industries Co., Ltd.) wherein THF is used as an eluent. As a result, the number-average molecular weight of the resulting poly (methyl methacrylate) was 10,300 and showed close agreement with the theoretical number-average molecular weight of 10,100 obtained by calculation from the phosphazenium compound and consumed MMA {calculation equation:

Number-average molecular weight=Molecular weight of methyl isobutyrate+(Number of moles of consumed MMA/Number of moles of phosphazenium compound)×Molecular weight of MMA, that is, 102+(50 mmol/0.5 mmol)×100, the same rule applies correspondingly to the following}. Furthermore, the molecular weight distribution is very narrow such as 1.06, thus resulting in finding that this polymer is a monodispersed polymer.

Living polymerization of methyl methacrylate

To confirm the living polymerizability of MMA due to the phosphazenium compound, MMA was polymerized in five stages, including Preparation Example of poly(methyl methacrylate) described above.

<First stage> is Preparation Example of poly(methyl methacrylate) described above.

<Second to fifth stage> In the very same manner as in Preparation Example of poly(methyl methacrylate) described above, except that the amount of the THF solution of 2.00 M methyl methacrylate in Preparation Example of poly(methyl methacrylate) described above was changed to a two-fold amount in the second stage, a three-fold amount in the third stage, a four-fold amount in the fourth stage and a five-fold amount in the fifth stage, respectively, and that the time required to add dropwise the solution in the respective stages was changed to about 25, 40, 50 and 60 minutes, respectively, MMA was polymerized. In any system, MMA was completely consumed.

The number-average molecular weight and molecular weight distribution of poly(methyl methacrylate) obtained in the respective stages were 20,900 (theoretical number-average molecular weight: 20,100) and 1.14 in the second stage, 28,600 (theoretical number-average molecular weight: 30,100) and 1.25 in the third stage, 41,500 (theoretical number-average molecular weight: 40,100) and 1.21 in the fourth stage and 48,100 (theoretical number-average molecular weight: 50,100) and 1.17 in the fifth stage, respectively.

As shown in FIG. 1, the number-average molecular weight of the polymer obtained in the respective stages showed considerably close agreement with the theoretical number-average molecular weight. A difference from the theoretical number-average molecular weight was 5% or less based on the theoretical number-average molecular weight. The molecular weight distribution of the resulting polymer was within a range from 1.06 to 1.25, thus resulting in finding that the polymer is a monodispersed polymer.

These results show that the polymerization of MMA due to the phosphazenium compound is proceeding by living polymerization.

Comparative Example 1

The polymerization was conducted as follows with reference to Table 1 and experimental section in page 717 of the document of T. Pietzonka and D. Seeback.

After a 200 ml flask was sufficiently dried, methyl isobutyrate (0.55 mmol) and 24 ml of dried THF were charged in the flask, followed by stirring to obtain a uniform solution. Then, 1.00 ml (0.50 mmol) of a solution of the 0.50 M phosphazene compound, prepared by concentrating a hexane solution of the 1.02 M phosphazene compound: [(Me$_2$N)$_3$P=N]$_3$P=NH-t-Bu used in the document to dryness and adding dried THF, was added to prepare a solution of tertiary-butyltris[tris(dimethylamino)phosphoralinideneamino]phosphonium(1-methoxy-2-methyl-1-propenyl)oxide: [(Me$_2$N)$_3$P=N]$_3$P$^+$NH-t-Bu, Me$_2$C=C(OMe)O$^-$. The solution was cooled to 0° C. and 25 ml of a THF solution of 2.00 M MMA (5.01 g: containing 50.0 mmol of MMA) was added dropwise at a rate at which the reaction temperature does not exceed 25° C. About 10 minutes was required for the dropwise addition. After the completion of the dropwise addition, the mixture was further stirred at 25° C. for one hour and 1.00 ml (1.00 mmol) of a THF solution of 1.0 M acetic acid was added to terminate the reaction. A trace amount of the reaction mixture was collected and subjected to quantitative analysis according to gas chromatography. As a result, methyl methacrylate was completely consumed. The reaction mixture was concentrated to dryness under reduced pressure to obtain 5.31 g of a white solid. A solution prepared by dissolving the white solid in 10 ml of THF was poured into 300 ml of methanol. The deposited solid was collected by filtration and the solid was washed twice with 10 ml of methanol. The resulting solid was dried at room temperature under 10 mmHg for six hours to obtain 4.34 g of odorless poly(methyl methacrylate).

The poly(methyl methacrylate) was subjected to GPC analysis. As a result, the resulting poly(methyl methacrylate) was a mixture of two kinds of polymers whose number-average molecular weight are 64,400 and 8,800, whereas, the theoretical number-average molecular weight was 10,100. Furthermore, the molecular weight distribution was wide such as 2.21. These results show that the polymerization reaction of MMA using the phosphazene compound as a catalyst is not accurately controlled.

Example 2

In the very same manner as in Preparation Example of poly(methyl methacrylate) in Example 1, except that methacrylonitrile (hereinafter abbreviated to MAN) was used in place of MMA used in Preparation Example of poly(methyl polymethacrylate) in Example 1 and N,N-dimethylformamide (hereinafter abbreviated as DMF) and DMF and a DMF solution were used in place of THF and a THF solution, the reaction was conducted. MAN was completely consumed. The number-average molecular weight of the resulting polymer was 8,160, whereas, the theoretical number-average molecular weight was 7,730, and the molecular weight distribution was narrow such as 1.32. It has been found that the polymerization reaction of MAN was accurately controlled by using the phosphazenium compound as the catalyst.

Comparative Example 2

In the very same manner as in Comparative Example 1, except that MAN was used in place of MMA and DMF and a DMF solution were used in place of THF and a THF solution, the reaction was conducted. MAN was completely consumed. The number-average molecular weight of the resulting poly(methacrylonitrile) was 450,000 and 11,200, whereas, the theoretical number-average molecular weight was 7,730, and the molecular weight distribution was 3.9.

Example 3

In the very same manner as in Preparation Example of poly(methyl methacrylate) in Example 1, except that 510 mg (5.00 mmol) of methyl isobutyrate as an active hydrogen compound was further contained in the uniform solution obtained in the same manner as in Preparation Example of poly(methyl methacrylate) in Example 1, the polymerization and termination reaction were conducted. In the same manner as in Preparation Example, quantitative analysis due to gas chromatography was conducted. As a result, MMA and methyl isobutyrate were completely consumed. The reaction mixture was concentrate to dryness under reduced pressure to obtain 5.93 g of a colorless solid. Part of this solid was collected and subjected to FD-mass spectrometry. As a result, all plural spectra observed at equal distances and the distance each spectra is a value of 100 corresponding to the molecular weight of MMA, and also formed normal distribution including a spectrum having a value of 1,102 as a vertex. These results show that the resulting solid is poly (methyl methacrylate) and has a number-average molecular weight of 1,102. This value shows that the polymerization initiates from an anion derived by elimination of a proton from 0.5 mmol of methyl isobutyrate (molecular weight is 102 in the used phosphazenium compound) and an anion derived by elimination of a proton from 5.0 mmol of methyl isobutyrate contained additionally in the polymerization reaction process and that the number-average molecular weight shows close agreement with the theoretical number-average molecular weight of 1,010 obtained by calculation from the phosphazenium compound and consumed MMA {calculation equation: Number-average molecular weight Molecular weight of methyl isobutyrate+(Number of moles of consumed MMA/Number of moles of phosphazenium compound)×Molecular weight of MMA, that is, 102+{50 mmol/(0.50 mmol+5.00 mmol)}×100}. In the same manner as in Preparation Example 1, GPC analysis was conducted. As a result, the molecular weight distribution was very narrow such as 1.08. It is possible to prepare polymer molecules whose number is equivalent to sum of the number of molecules of the phosphazenium compound and the number of molecules of additionally contained active hydrogen compound by polymerization in the presence of the phosphazenium compound and active hydrogen compound. As described above, the number larger by far than that of the catalyst of polymer molecules can be prepared while controlling the average molecular weight, and its industrial value is significantly great.

Example 4

After a 200 ml flask was sufficiently dried, 10.0 g (100 mmol) of MMA purified by distillation and 40 ml of dried tetrahydrofuran were charged in the flask under a nitrogen atmosphere, followed by stirring to obtain a uniform solution. While maintaining the temperature of the uniform solution at 30° C., 10 ml of a THF solution containing 0.771 g (1.00 mmol) of tetrakis[tris(dimethylamino) phosphoralinideneamino]phosphonium methoxide: $[(Me_2N)_3P=N]_4P^+,^-OMe$ wherein R in the phosphazenium compound represented by the formula (1) is a methyl group, a, b, c and d each represents 1, and $Z^-$ is an anion derived by elimination of a proton from methanol was added dropwise. After stirring the same temperature for three hours, 2.50 ml (2.50 mmol) of a diethyl ether solution of 1.0 M hydrogen chloride was added to terminate the reaction. As a result, MMA was completely consumed. The reaction mixture was poured into 500 ml of hexane. The deposited solid was collected by filtration and the solid was washed twice with 20 ml of hexane. The resulting solid was dried at room temperature under 10 mmHg for six hours to obtain 9.51 g of poly(methyl methacrylate) as a colorless solid. The number-average molecular weight of the solid was 9,900 and the molecular weight distribution was 1.45.

Examples 5 to 11

In the very same manner as in Example 4, except that an equimolar amount (100 mmol) of various polar unsaturated compounds shown in Table 1 was used in place of MMA and an equimolar amount (1.00 mmol) of various phosphazenium compounds shown in Table 1 was used in place of tetrakis[tris(dimethylamino)phosphoranilideneamino] phosphonium methoxide, and that same amount of solvents shown in Table 1 was used in place of THF and the reaction temperature and reaction time were changed as shown in Table 1, the reaction was conducted to obtain polymers corresponding to various polar unsaturated compounds. All these results were shown in Table 1.

Example 12

In the very same manner as in Example 4, except that N,N-dimethylacrylamide was used in place of MMA and the reaction temperature and reaction time were changed to 0° C. and six hours, and that diethyl ether was used in place of hexane, the reaction was conducted. The consumption percentage of N,N-dimethylacrylamide was 99% and 9.56 g of poly(N,N-dimethylacrylamide). was obtained as an odorless solid. The number-average molecular weight of resulting solid was 8,700 and the molecular weight distribution was 1.38.

Example 13

In the very same manner as in Example 4, except that the same amount (100 mmol) of N-acryloylmorpholine was used in place of MMA and the reaction temperature and reaction time were changed to 0° C. and six hours, and that the same amount of diethyl ether was used in place of hexane, the reaction was conducted. The consumption percentage of N-acryloylmorpholine was 96% and 12.7 g of poly(N-acryloylmorpholine) was obtained as an odorless solid. The number-average molecular weight of resulting solid was 12,600 and the molecular weight distribution was 1.67.

Example 14

In the very same manner as in Example 4, except that the same amount (100 mmol) of 2-vinylpyridine was used in place of MMA and the reaction temperature and reaction time were changed to 50° C. and six hours, the reaction was conducted to obtain a reaction mixture. The consumption percentage of 2-vinylpyridine was 94%. The reaction mixture was poured into 500 ml of hexane. An insoluble oily substance was collected by partitioning and 20 ml of hexane was further added, followed by vigorous stirring for 10 minutes. The stirring was terminated and, after the mixture was allowed to stand, the insoluble oily substance was collected again by partitioning. The insoluble oily substance was allowed to stand at room temperature under 10 mmHg for six hours to obtain 9.35 g of poly(2-vinylpyridine) as an odorless oily substance. The number-average molecular weight of the resulting oily substance was 1,400 and the molecular weight distribution was 1.45.

Example 15

In the very same manner as in Example 4, except that the same amount (100 mmol) of N-phenylmaleimide was used in place of MMA and the reaction time were changed to six hours, the reaction was conducted to obtain a reaction mixture. The consumption percentage of N-phenylmaleimide was 92%. The reaction mixture was cooled to 0° C. and then allowed to stand at the same temperature for 15 hours. The deposited solid was collected by filtration and the solid was washed twice with 20 ml of THF. The resulting solid was allowed to stand at room temperature under 10 mmHg for six hours to obtain 15.1 g of poly(N-phenylmaleimide) as an odorless solid. The number-average molecular weight of resulting solid was 6,200 and the molecular weight distribution was 1.32.

Example 16

After a 200 ml flask was sufficiently dried, 9.90 g (50.0 mmol) of 1,4-butanediol diacrylate purified by distillation and 40 ml of dried tetrahydrofuran were charged in the flask, followed by stirring to obtain a uniform solution. While maintaining the temperature of the uniform solution at 30° C., 10 ml of a THF solution containing 0.771 g (1.00 mmol) of tetrakis[tris(dimethylamino)phosphoralinideneamino] phosphonium methoxide was added. After two hours, the whole reaction solution was solidified in the form of jelly. The solidified matter was concentrated to dryness at 50° C. under 5 mmHg to obtain 9.75 g of an odorless solid. The solid is insoluble in a solvent used conventionally and the average molecular weight of the solid could not be measured.

Example 17

After a 200 ml flask was sufficiently dried, 5.00 g (50.0 mmol) of MMA as a primary polar unsaturated compound purified by distillation, 4.96 g (50.0 mmol) of N,N-dimethylacrylamide as a secondary polar unsaturated compound purified by distillation and 40 ml of dried THF were charged in the flask, followed by stirring to obtain a uniform solution. While maintaining the temperature of the uniform solution at 30° C., 10 ml of a THF solution containing 1.07 g (1.00 mmol) of tris(n-octylmethylamino)phosphoranilideneaminotris[tris(dimethylamino)phosphoralinideneamino]phosphonium methoxide: $[(Me_2N)_3P=N]_3[(n\text{-}Oct(Me)N)_3P=N]P^+,^-OMe$ wherein R in the phosphazenium compound represented by the formula (1) is a methyl group and an octyl group, a, b, c and d each represents 1, and $Z^-$ is an anion derived by elimination of a proton from methanol was added. After stirring the same temperature for three hours, 2.50 ml (2.50 mmol) of a diethyl ether solution of 1.0 M hydrogen chloride was added to terminate the reaction. As a result, the consumption percentage of MMA and that of N,N-dimethylacrylamide were 98% and 95%, respectively. The reaction mixture was then poured into 500 ml of hexane. The deposited solid was collected by filtration and the solid was washed twice with 20 ml of hexane. The resulting solid was dried at room temperature under 10 mmHg for six hours to obtain 9.08 g of an odorless solid. The solid was a random copolymer wherein MMA and N,N-dimethylacrylamide are polymerized at random in a molar ratio of about 1:1. The number-average molecular weight of the solid was 10,500.

Example 18

After a 200 ml flask was sufficiently dried, 5.00 g (50.0 mmol) of MMA as a primary polar unsaturated compound purified by distillation and 40 ml of dried THF were charged in the flask, followed by stirring to obtain a uniform solution. While maintaining the temperature of the uniform solution at 30° C., 10 ml of a THF solution containing 0.771 g (1.00 mmol) of tetrakis[tris(dimethylamino) phosphoralinideneamino]phosphonium methoxide was added. After stirring the same temperature for one hour, 10 ml of a THF solution containing 4.96 g (50.0 mmol) of N,N-dimethylacrylamide as a secondary polar unsaturated compound was added at 30° C. After stirring for additional three hours, 2.50 ml (2.50 mmol) of a diethyl ether solution of 1.0 M hydrogen chloride was added to terminate the reaction. As a result, the consumption percentage of MMA and that of N,N-dimethylacrylamide were 99% and 98%, respectively. The reaction mixture was then poured into 500 ml of hexane. The deposited solid was collected by filtration and the solid was washed twice with 20 ml of hexane. The resulting solid was dried at room temperature under 10 mmHg for six hours to obtain 9.33 g of an odorless solid. The solid was a block copolymer having a block of poly (methyl methacrylate)poly(N,N-dimethylacrylamide), which contains a block of poly(methyl methacrylate) and a block of poly(N,N-dimethylacrylamide) in a ratio (molar ratio) of about 1:1. The number-average molecular weight of the solid was 11,200 and the molecular weight distribution was 1.43.

Example 19

In the very same manner as in Example 18, except that an equimolar amount of N,N-dimethylacrylamide was used in place of MMA as the primary polar unsaturated compound in Example 18 and propylene oxide was used in place of N,N-dimethylacrylamide used in Example 18 as the secondary polar unsaturated compound, the reaction was conducted to obtain 7.56 g of poly(N,N-dimethylacrylamide)-poly (propylene oxide)monool having a block of poly(N,N-dimethylacrylamide) and a block of poly(propylene oxide). The number-average molecular weight of the resulting polymer was 8,930 and the molecular weight distribution was 1.63.

Example 20

In the very same manner as in Example 4, except that 5.00 mg (corresponding to 500 ppm based on the weight of MMA) of hydroquinone as a radical polymerization inhibitor was further added to the resulting uniform solution obtained in the same manner as in Example 4, the reaction was conducted. The consumption percentage of MMA was 99% and 9.56 g of poly(methyl methacrylate) was obtained as a odorless solid. The number-average molecular weight of the resulting solid was 9,780 and the molecular weight distribution was 1.57.

Example 21

In the very same manner as in Example 3, except that an equimolar amount of tetrakis[tris(dimethylamino) phosphoranilideneamino]phosphonium methoxide was used in place of the phosphazenium compound used in Example 3, the operation up to concentration to dryness was conducted to obtain 5.78 g of a colorless solid. MMA and methyl isobutyrate were completely consumed. The number-average molecular weight of the resulting poly (methyl methacrylate) was 1,150, while the theoretical number-average molecular weight was 1,010, and the molecular weight distribution was 1.35.

Example 22

In the very same manner as in Example 3, except that 1.50 mmol of dimethyl methylmalonate was used in place of methyl isobutyrate contained further in Example 3, the operation up to concentration to dryness was conducted to obtain 5.05 g of a colorless solid. The consumption percentage of MMA and that of dimethyl methylmalonate were 91% and 100%, respectively. The number-average molecular weight of the resulting poly(methyl methacrylate) was 2,470 and the molecular weight distribution was 1.21.

Example 23

In the very same manner as in Example 3, except that an equimolar of 1,2-bis(isopropylcarbonyloxy)ethane was used in place of methyl isobutyrate contained further in Example 3, the operation up to concentration to dryness was conducted to obtain 4.87 g of a colorless solid. MMA and 1,2-bis(isopropylcarbonyloxy)ethane were completely consumed. The number-average molecular weight of the resulting poly(methyl methacrylate) was 1,250 and the molecular weight distribution was 1.36.

Example 24

In the very same manner as in Example 3, except that an equimolar of 1,3-propanediol was used in place of methyl isobutyrate contained further in Example 3, the operation up to concentration to dryness was conducted to obtain 5.05 g of a colorless solid. The consumption percentage of MMA and that of 1,3-propanediol were 100% and 87%, respectively. The number-average molecular weight of the resulting poly(methyl methacrylate) was 1,310 and the molecular weight distribution was 1.63.

Example 25

In the very same manner as in Example 3, except that 1.50 mmol of poly(propylene oxide) having hydroxyl groups at both terminals (average molecular weight: 1,030) was used in place of methyl isobutyrate contained further in Example 3, the operation up to concentration to dryness was conducted to obtain 6.94 g of a colorless oily substance. MMA was completely consumed. The resulting polymer had a block of poly(propylene oxide) and that of poly(methyl methacrylate). The number-average molecular weight of the resulting polymer was 3,290 and the molecular weight distribution was 1.55.

Example 26

In the very same manner as in Example 3, except that an equimolar amount of N,N-dimethylacrylamide was used in place of MMA used in Example 3 and 1.50 mmol of poly(propylene oxide) having hydroxyl groups at both terminals (average molecular weight: 1,030) was used in place of methyl isobutyrate contained further, the operation up to concentration to dryness was conducted to obtain 6.79 g of a colorless solid. N,N-dimethylacrylamide was completely consumed. The resulting polymer had a block of poly(propylene oxide) and that of poly(N,N-dimethylacrylamide). The number-average molecular weight of the resulting polymer was 3,630 and the molecular weight distribution was 1.75.

Example 27

In the very same manner as in Example 1, except that tertiary-butyl methacrylate was used in place of MMA used in Preparation Example of poly(methyl methacrylate) of Example 1, the reaction was conducted to obtain a polymerization reaction solution. Subsequently, 0.040 g (0.55 mmol) of butyl aldehyde was added at the same temperature, followed by stirring for additional one hour. Then, 1.00 ml (1.00 mmol) of a THF solution of 1.0 M acetic acid was added to terminate the reaction. The consumption percentage of tertiary-butyl methacrylate and that of butyl aldehyde were 100% and 92%, respectively. The reaction mixture was concentrated to dryness under reduced pressure to obtain 5.50 g of a white solid. A solution prepared by dissolving the white solid in 10 ml of THF was poured into 300 ml of methanol. The deposited solid was collected by filtration and the solid was washed twice with 10 ml of methanol. The resulting solid was dried at room temperature under 10 mmHg for six hours to obtain 4.55 g of an odorless poly(methyl methacrylate)monool having a hydroxyl group at one terminal of poly(methyl methacrylate). The number-average molecular weight and the molecular weight distribution of the poly(methyl methacrylate)monool were 11,100 and 1.26, respectively.

Example 28

In the very same manner as in Example 27, except that N,N-dimethylacrylamide was used in place of tertiary-butyl methacrylate in Example 27, the reaction was conducted to obtain 4.21 g of an odorless poly(N,N-dimethylacrylamide) monool having a hydroxyl group at one terminal of poly(N,N-dimethylacrylamide). The number-average molecular weight and the molecular weight distribution of the poly(N,N-dimethylacrylamide)monool were 12,000 and 1.66, respectively.

Example 29

In the very same manner as in Example 3, except that 5.00 mmol of 1,3-propanediol and 0.500 mmol of α-hydroxyisopropyl phenyl ketone was used in place of methyl isobutyrate contained further in Example 3, the operation up to concentration to dryness was conducted to obtain 6.17 g of a colorless solid. The consumption percentage of MMA and that of 1,3-propanediol were 100% and 100%, respectively. The number-average molecular weight of the resulting poly(methyl methacrylate) was 1,060 and the molecular weight distribution was 1.07. By addition of a small amount of α-hydroxyisopropyl phenyl ketone, the consumption percentage of 1,3-propanediol was changed from 87% (this value was one of 1,3-propanediol in Example 24) to 100%, and further the polymer with more narrow molecular weight distribution was obtained.

TABLE 1

| Examples | Polar unsaturated compound | Phosphazenium compound | Solvent |
|---|---|---|---|
| Example 5 | Methyl acrylate | $[(Me_2N)_3P=N]_4P^+$, $^-$O-t-Bu | Toluene |
| Example 6 | Tetrahydrofurfuryl acrylate | $[(Me_2N)_3P=N]_4P^+$, $^-$OPh | Benzene |
| Example 7 | 2-ethoxyethyl acrylate | $[(Me_2N)_3P=N]_4P^+$, $F^-$ | 1,4-dioxane |
| Example 8 | Acrylonitrile | $[(Me_2N)_3P=N]_4P^+$, $^-$OH | DMF |
| Example 9 | Methcrylonitrile | $[(Me_2N)_3P=N]_4P^+$, $^-$CN | THF |
| Example 10 | Isopropenyl methyl ketone | $[(Me_2N)_3P=N]_4P^+$, $^-$S-t-Bu | Benzene |
| Example 11 | p-t-butoxycarbonyl styrene | $[(Me_2N)_3P=N]_3P^+$, $NMe_2$, $^-$CN | THF |

Note: In Table 1, $[(Me_2N)_3P=N]_4P^+$ denotes tetrakis[tris(dimethylamino)phosphoranilideneamino] phosphonium, $[(Me_2N_3)P=N]_3P^+NMe_2$ denotes tris[tris(dimethylamino)phosphoranilideneamino] dimethylaminophosphonium cation, $^-$O-t-Bu denotes t-butoxy anion, $^-$OPh denotes phenoxy anion, $^-$OH denotes hydroxy anion, $^-$S-t-Bu denotes t-butylmercapto anion, DMF denotes N,N-dimethylformamide, Mn denotes number-average molecular weight, and Mw/Mn denotes molecular weight distribution, respectively.

| Examples | Reaction conditions | | Consumption (%) of vinyl compound | Polymer's | | |
| | Temperature (° C.) | Time (hours) | | Yield (g) | $M_n$ | $M_w/M_n$ |
|---|---|---|---|---|---|---|
| Example 5 | 0 | 3 | 100 | 8.01 | 9,400 | 1.43 |
| Example 6 | 30 | 3 | 95 | 14.4 | 15,100 | 1.27 |
| Example 7 | 40 | 5 | 99 | 14.2 | 13,200 | 1.19 |
| Example 8 | 10 | 8 | 97 | 4.99 | 14,000 | 1.56 |
| Example 9 | 30 | 10 | 98 | 6.17 | 3,450 | 1.43 |
| Example 10 | 25 | 6 | 99 | 7.93 | 9,750 | 1.18 |
| Example 11 | 30 | 5 | 100 | 18.7 | 19,300 | 1.38 |

What is claimed is:

1. A method for preparing a living polymer, which comprises subjecting a polar unsaturated compound, having carbon-carbon double bond, to anionic polymerization in the presence of a phosphazenium compound represented by the formula (1):

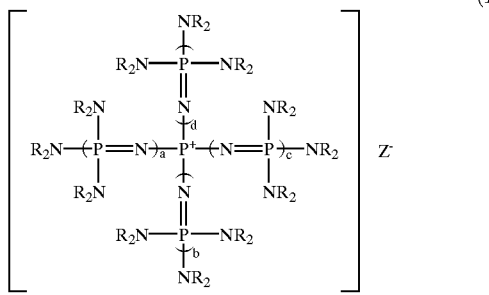

(1)

(wherein $Z^-$ is an anion of an active hydrogen compound that is derived by elimination of a proton from the active hydrogen compound; a, b, c and d each represents 1 or 0, but all of them are not simultaneously 0; and R may be the same or different and each represents a hydrocarbon group having 1 to 10 carbon atoms, and two R(s) on the same nitrogen atom are optionally combined with each other to form a cyclic structure), or in the presence of the phosphazenium compound and an active hydrogen compound.

2. The method according to claim 1, wherein the polar unsaturated compound is a compound having a polar functional group selected from the group consisting of carbonyl group, cyano group and pyridyl group, and an unsaturated group in the same molecule, and the both form a conjugated system directly or indirectly.

3. The method according to claim 1, wherein the polar unsaturated compound is a substance selected from the group consisting of (meth)acrylates, (meth)acrylonitriles, acrylamides, vinyl pyridines, N-substituted maleimides, vinyl ketones and styrene derivatives.

4. The method according to claim 1, wherein the polar unsaturated compound is a substance selected from the group consisting of monoesters of monohydric alcohols and acrylic acid or methacrylic acid, monoesters of dihydric alcohols having a terminal protected with an ether bond and acrylic acid or methacrylic acid, polyhydric esters wherein all hydroxyl groups of dihydric or polyhydric alcohols and acrylic acid or methacrylic acid are esterified, acrylonitrile, methacrylonitrile, N,N-di-substituted monoacrylamides, vinyl or isopropenyl-substituted pyridines, N-aromatic-substituted maleimides, and vinyl ketones.

5. The method according to claim 4, wherein R in the phosphazenium compound represented by the formula (1) may be the same or different and each represents an aliphatic hydrocarbon groups having 1 to 8 carbon atoms.

6. The method according to claim 4, wherein R in the phosphazenium compound represented by the formula (1) is a methyl group.

7. The method according to claim 4, wherein a cyclic amino group formed in case where two R(s) on the same nitrogen atom in the phosphazenium compound represented by the formula (1) are combined with each other, together with the nitrogen atom, to form a cyclic structure is a cyclic secondary amino group containing 4 to 6 carbon atoms on the ring.

8. The method according to claim 7, wherein a, b, c and d in the phosphazenium compound represented by the formula (1) is a numeral in a combination of (1, 1, 1, 1) or (0, 1, 1, 1) regardless of the sequence.

9. The method according to claim 8, wherein the active hydrogen compound that affords $Z^-$ in the phosphazenium compound represented by the formula (1), or the active hydrogen compound used in the anionic polymerization conducted in the presence of the phosphazenium compound and the active hydrogen compound includes a substance selected from the group consisting of hydrogen cyanide, monohydric carboxylates, polyhydric carboxylates, water, monohydric alcohols, polyhydric alcohols, monohydric thiol, poly(alkylene oxides), poly{(meth)acrylates}, poly{(meth)acrylonitriles}, poly(acrylamides), poly(vinylpyridines), poly(N-substituted maleimides), poly(vinyl ketones), poly(styrene derivatives), and copolymers of alkylene oxides, (meth)acrylates, (meth)acrylonitriles, acrylamides, vinylpyridines, N-substituted maleimides, vinyl ketones and/or styrene derivatives, each having active hydrogen at a terminal and/or in a principal chain.

10. The method according to claim 9, wherein a copolymer is prepared by using at least one polar unsaturated compound, having carbon-carbon double bond, in combination with at least one other compound.

11. The method according to claim 10, wherein the copolymer is prepared by using the polar unsaturated compound in combination with an alkylene oxide compound.

12. The method according to claim 10, wherein the copolymer is prepared by using the polar unsaturated compound in combination with propylene oxide and/or ethylene oxide.

13. The method according to claim 10, wherein the copolymer is a block copolymer and the block copolymer is prepared by using the polar unsaturated compound in combination with an alkylene oxide compound in sequence.

14. The method according to claim 10, wherein a polymer is prepared by subjecting the polyunsaturated compound to the anionic polymerization, followed by a reaction with an alkylene oxide and/or aldehydes.

15. The method according to claim 1, wherein R in the phosphazenium compound represented by the formula (1) may be the same or different and each represents an aliphatic hydrocarbon groups having 1 to 8 carbon atoms.

16. The method according to claim 1, wherein R in the phosphazenium compound represented by the formula (1) is a methyl group.

17. The method according to claim 1, wherein the cyclic amino group in case where two R(s) on the same nitrogen atom in the phosphazenium compound represented by the formula (1) are combined each other, together with the nitrogen atom, to form a cyclic structure is a cyclic secondary amino group containing 4 to 6 carbon atoms on the ring.

18. The method according to claim 1, wherein a, b, c and d in the phosphazenium compound represented by the formula (1) is a numeral in a combination of (1, 1, 1, 1) or (0, 1, 1, 1) regardless of the sequence.

19. The method according to claim 1, wherein the active hydrogen compound that affords $Z^-$ in the phosphazenium compound represented by the formula (1), or the active hydrogen compound used in the anionic polymerization conducted in the presence of the phosphazenium compound and the active hydrogen compound includes a substance selected from the group consisting of hydrogen cyanide, monohydric carboxylates, polyhydric carboxylates, water, monohydric alcohols, polyhydric alcohols, monohydric thiol, poly(alkylene oxides), poly{(meth)acrylates}, poly{(meth)acrylonitriles}, poly(acrylamides), poly(vinylpyridines), poly(N-substituted maleimides), poly(vinyl ketones), poly(styrene derivatives), and copolymers of alkylene oxides, (meth)acrylates, (meth)acrylonitriles, acrylamides, vinylpyridines, N-substituted maleimides, vinyl ketones and/or styrene derivatives, each having active hydrogen at a terminal and/or in a principal chain.

20. The method according to claim 1, wherein the copolymer is prepared by using at least two polar unsaturated compounds in combination.

21. The method according to claim 1, wherein the copolymer is prepared by using the polar unsaturated compound in combination with the alkylene oxide compound.

22. The method according to claim 1, wherein the copolymer is prepared by using the polar unsaturated compound in combination with the propylene oxide and/or ethylene oxide.

23. The method according to claim 1, wherein the copolymer is block copolymer and the block copolymer prepared by using the polar unsaturated compound in combination with the alkylene oxide compound in sequence.

24. The method according to claim 1, wherein a polymer having a hydroxyl group at at least one terminal is prepared by subjecting the polar unsaturated compound to the anionic polymerization, followed by a reaction with an alkylene oxide and/or aldehydes.

* * * * *

UNITED STATES PATENT AND TRADEMARK OFFICE
CERTIFICATE OF CORRECTION

PATENT NO. : 6,528,599 B1
DATED : March 4, 2003
INVENTOR(S) : Tadahito Nobori et al.

It is certified that error appears in the above-identified patent and that said Letters Patent is hereby corrected as shown below:

<u>Title page,</u>
Item [57], ABSTRACT,
Line 17, change "may" to -- maybe --
Line 20, after "combined" insert -- with --.

<u>Column 23,</u>
Line 30, change "polyunsaturated" to -- polar unsaturated --.

Signed and Sealed this

Fourteenth Day of October, 2003

JAMES E. ROGAN
*Director of the United States Patent and Trademark Office*